US008628054B2

(12) United States Patent
Kaybidge et al.

(10) Patent No.: US 8,628,054 B2
(45) Date of Patent: Jan. 14, 2014

(54) SUPPORT BECKET FOR RIG OPERATIONS

(75) Inventors: Reece William Kaybidge, Edmonton (CA); Kevin Michael Harty, Edmonton (CA); Andy Rotanak Young, Edmonton (CA)

(73) Assignee: National Oilwell Varco L.P., Houston, TX (US)

( * ) Notice: Subject to any disclaimer, the term of this patent is extended or adjusted under 35 U.S.C. 154(b) by 0 days.

(21) Appl. No.: 13/156,559

(22) Filed: Jun. 9, 2011

(65) Prior Publication Data

US 2011/0285156 A1 Nov. 24, 2011

Related U.S. Application Data

(62) Division of application No. 12/292,899, filed on Nov. 25, 2008, now abandoned.

(51) Int. Cl.
*F16M 13/00* (2006.01)

(52) U.S. Cl.
USPC .................................. 248/580; 59/93; 294/131

(58) Field of Classification Search
USPC .......... 248/580; 294/82.1, 82.11, 131, 75, 74; 59/93
See application file for complete search history.

(56) References Cited

U.S. PATENT DOCUMENTS

| | | | | | |
|---|---|---|---|---|---|
| 48,844 | A * | 7/1865 | Shogren | 278/96.2 |
| 729,611 | A | 6/1903 | Lane | 54/50 |
| 1,297,300 | A | 3/1919 | Preissler | 294/84 |
| 1,379,133 | A | 5/1921 | Speece | 24/232 UX |
| 1,554,303 | A | 9/1925 | Smith | |
| 1,557,802 | A | 10/1925 | Clark | |
| 1,626,866 | A | 5/1927 | Neilson | |
| 1,758,722 | A | 5/1930 | Symonds | 294/83 R |
| 2,436,247 | A * | 2/1948 | Bufflap | 294/74 |
| 2,538,356 | A * | 1/1951 | Donda | 59/85 |
| 2,605,130 | A | 7/1952 | Meighan | 294/75 |
| 3,055,168 | A | 9/1962 | Towry | 59/84 |
| 3,114,955 | A | 12/1963 | Ahlquist | |
| 3,153,828 | A * | 10/1964 | Glover | 24/115 R |
| 3,224,185 | A * | 12/1965 | Grim et al. | 59/86 |
| 3,428,355 | A | 2/1969 | Hamilton | 294/82 R |
| 3,739,571 | A | 6/1973 | Lashar, Jr. | 59/84 |
| 3,782,772 | A | 1/1974 | Cranston, III et al. | 294/82 |
| 3,905,179 | A | 9/1975 | Bischeltsrieder | 54/47 |
| 4,017,111 | A | 4/1977 | Sandnes | 294/82.19 |
| 4,061,388 | A | 12/1977 | Wilkinson | 294/82 R |
| 4,094,141 | A | 6/1978 | Rehbein | 59/93 |
| 4,137,704 | A * | 2/1979 | Schreyer | 59/86 |
| D253,734 | S | 12/1979 | Howard | D21/255 |
| 4,398,729 | A | 8/1983 | Bishop et al. | 277/325 |
| D288,464 | S | 2/1987 | Udelhofen | D21/254 |
| 5,251,870 | A | 10/1993 | Ward | 251/1.3 |
| 5,391,013 | A | 2/1995 | Ricks et al. | 403/59 |
| 5,647,198 | A * | 7/1997 | Mihailovic | 59/86 |
| 5,660,423 | A | 8/1997 | Herman et al. | 294/74 |
| D431,180 | S | 9/2000 | Gray, Jr. | D8/367 |
| 6,226,900 | B1 | 5/2001 | Mazars | 36/132 |
| 6,298,528 | B1 * | 10/2001 | Workman | 24/700 |
| 6,364,076 | B1 | 4/2002 | Braun et al. | 188/327 |
| D459,854 | S | 7/2002 | Fujikawa et al. | D34/35 |
| D523,210 | S | 6/2006 | Folk et al. | D34/35 |

(Continued)

*Primary Examiner* — Bradley Duckworth
(74) *Attorney, Agent, or Firm* — Amerson Law Firm PLLC

(57) ABSTRACT

A support member or becket for supporting an item during wellbore operations including a body with a support area, and a wear insert removable emplaced over the support area.

33 Claims, 16 Drawing Sheets

(56) References Cited

U.S. PATENT DOCUMENTS

| | | | | |
|---|---|---|---|---|
| 7,059,023 | B1 | 6/2006 | Wu | 24/376 |
| 2003/0161561 | A1 | 8/2003 | Cox et al. | 384/434 |
| 2004/0113108 | A1 | 6/2004 | Ward | 251/1.3 |
| 2005/0039424 | A1 | 2/2005 | Zucchini | 54/47 |
| 2008/0166189 | A1 | 7/2008 | Stager | 407/2 |
| 2009/0090524 | A1 | 4/2009 | Carson et al. | 172/772 |

* cited by examiner

FIG. 1C
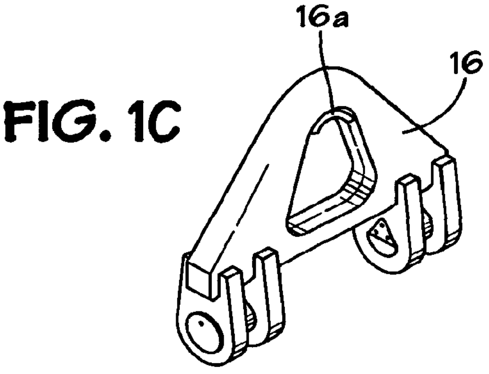
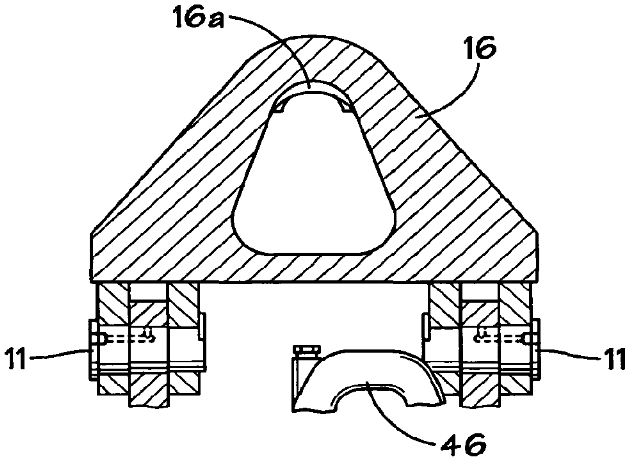
FIG. 1D
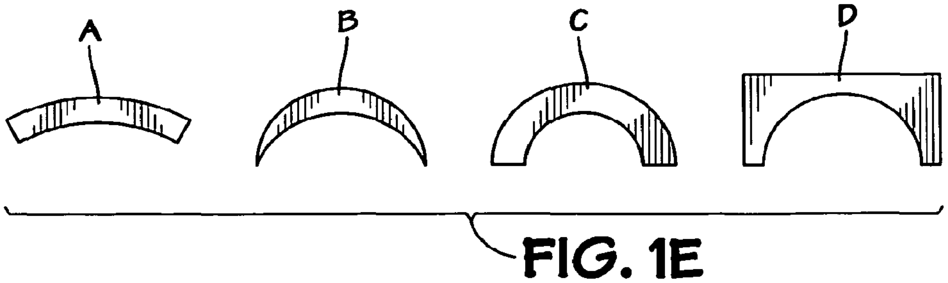
FIG. 1E

FIG. 1F
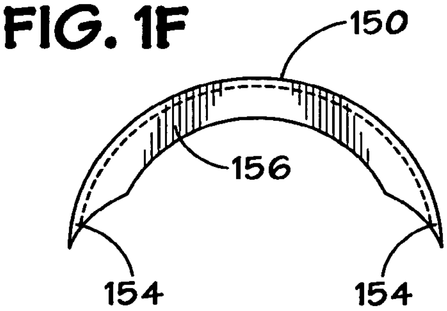
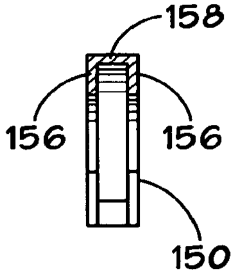
FIG. 1H
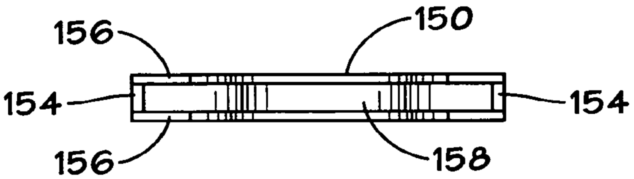
FIG. 1G
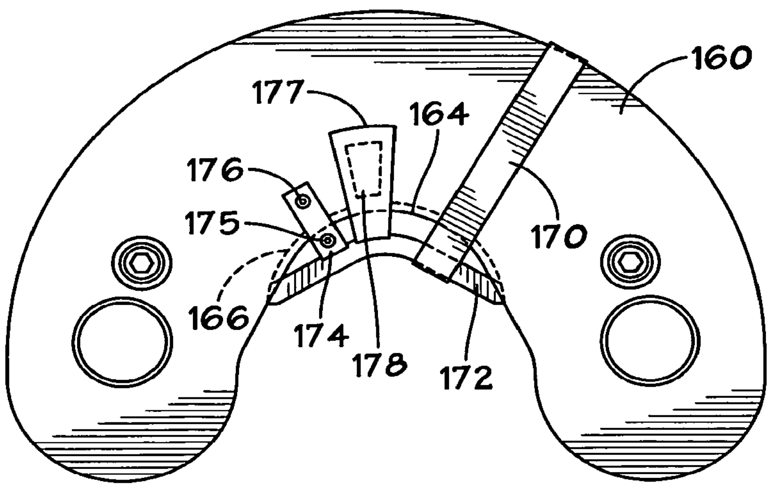
FIG. 1I

FIG. 2A
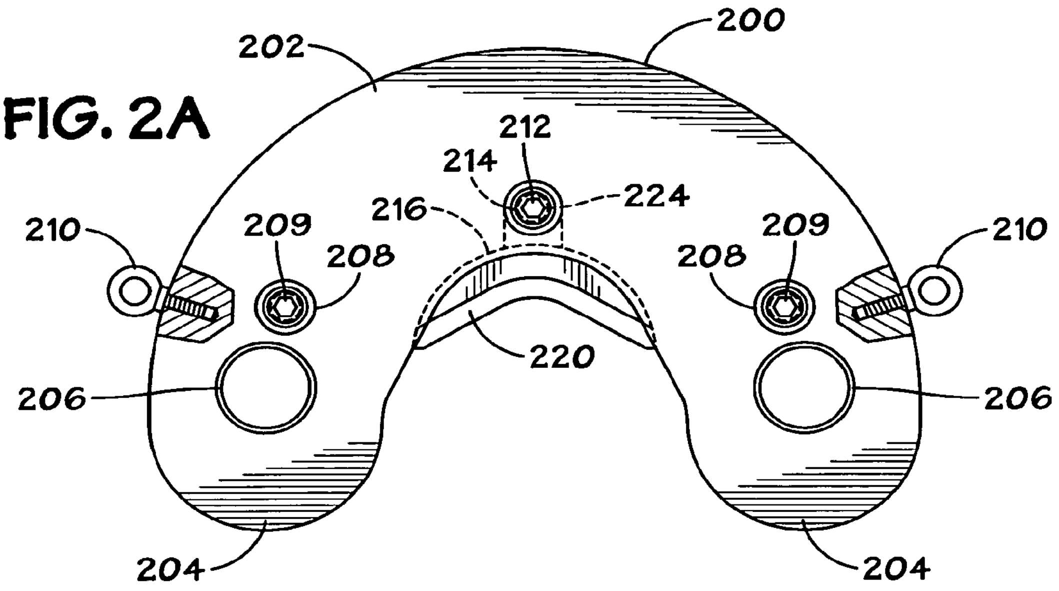
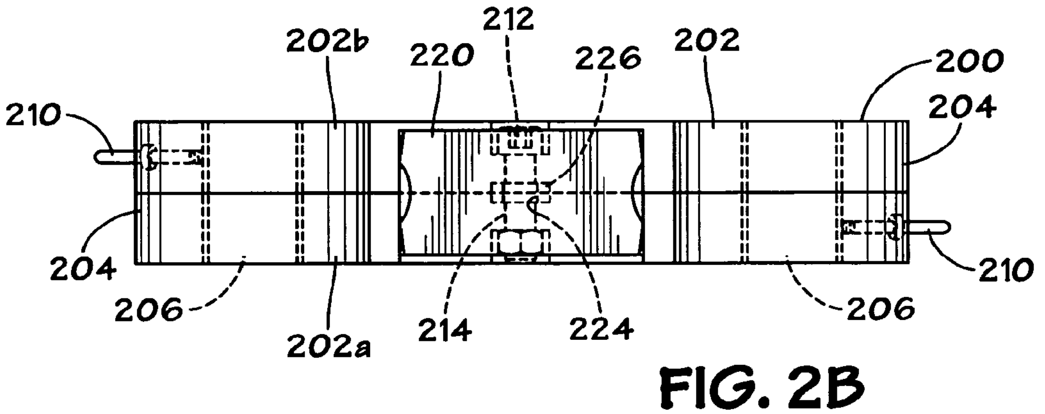
FIG. 2B
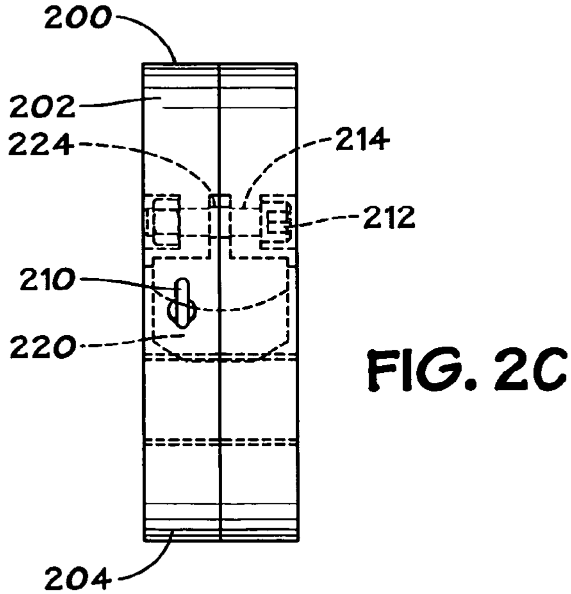
FIG. 2C

FIG. 3A
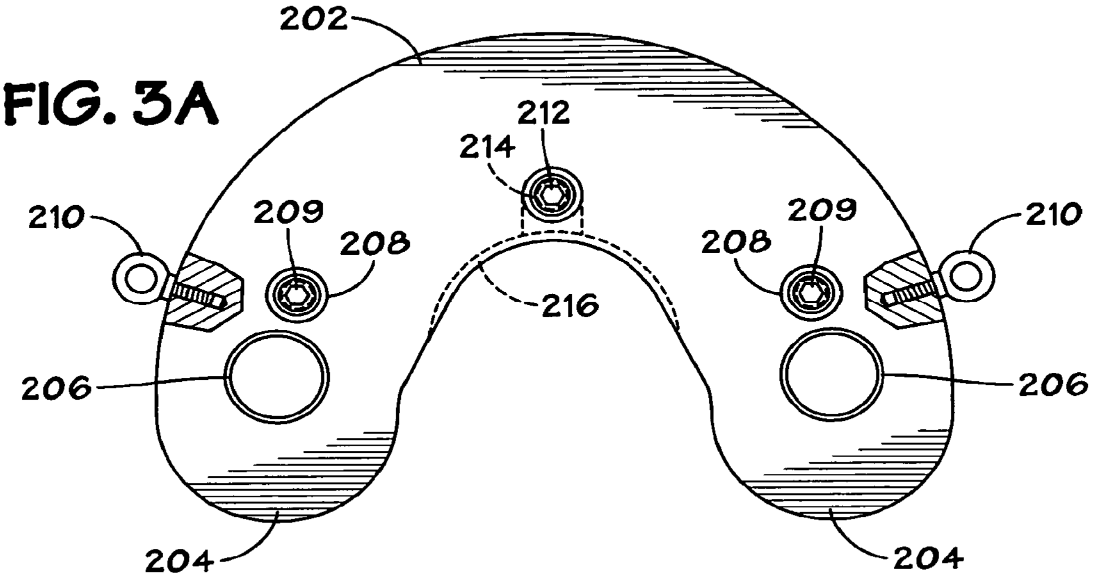
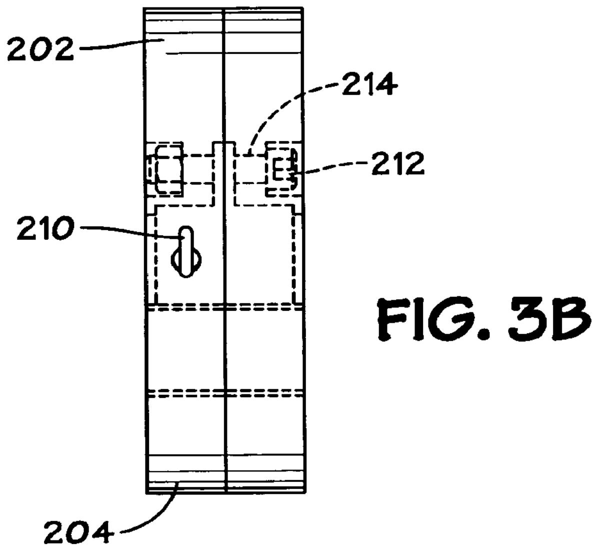
FIG. 3B

FIG. 4A
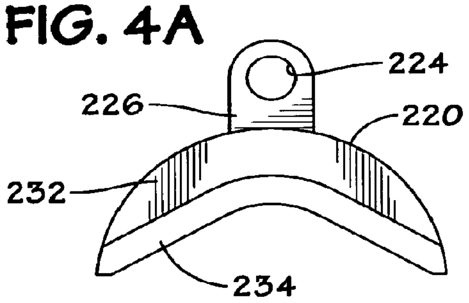
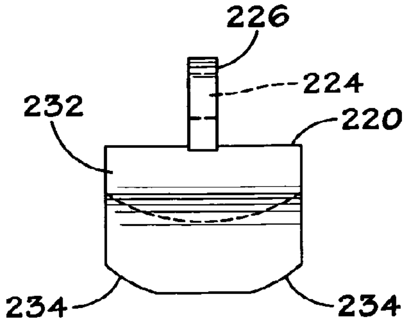
FIG. 4C
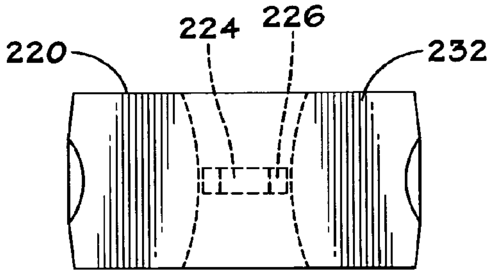
FIG. 4B
FIG. 5
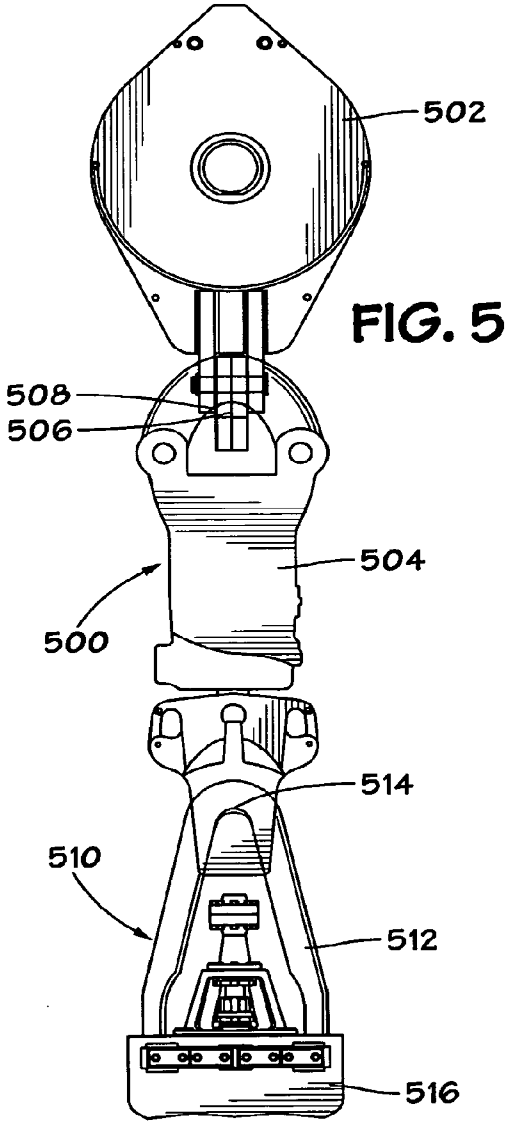
FIG. 6
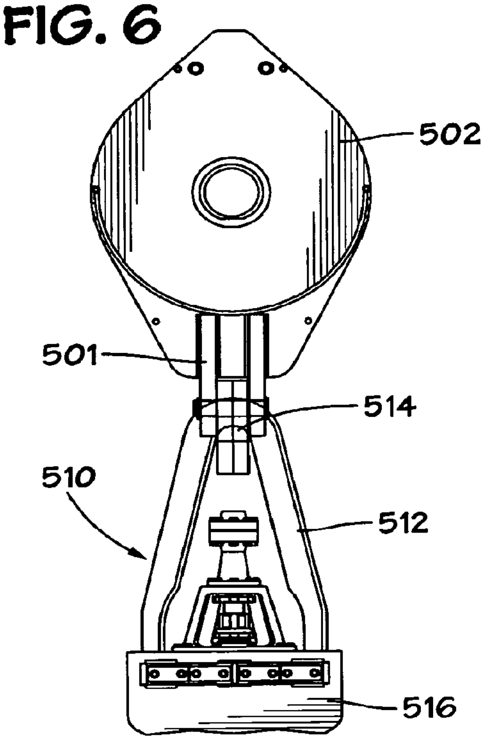

FIG. 8C
(PRIOR ART)
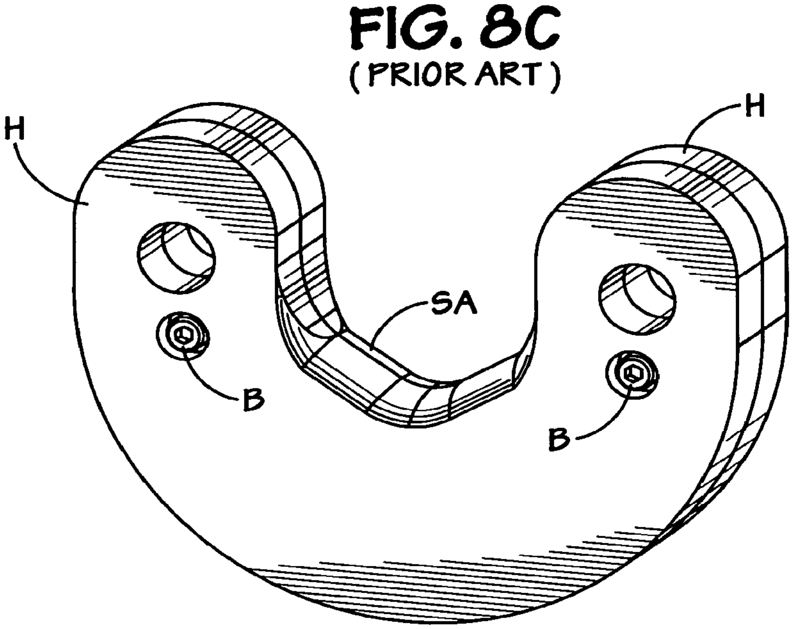
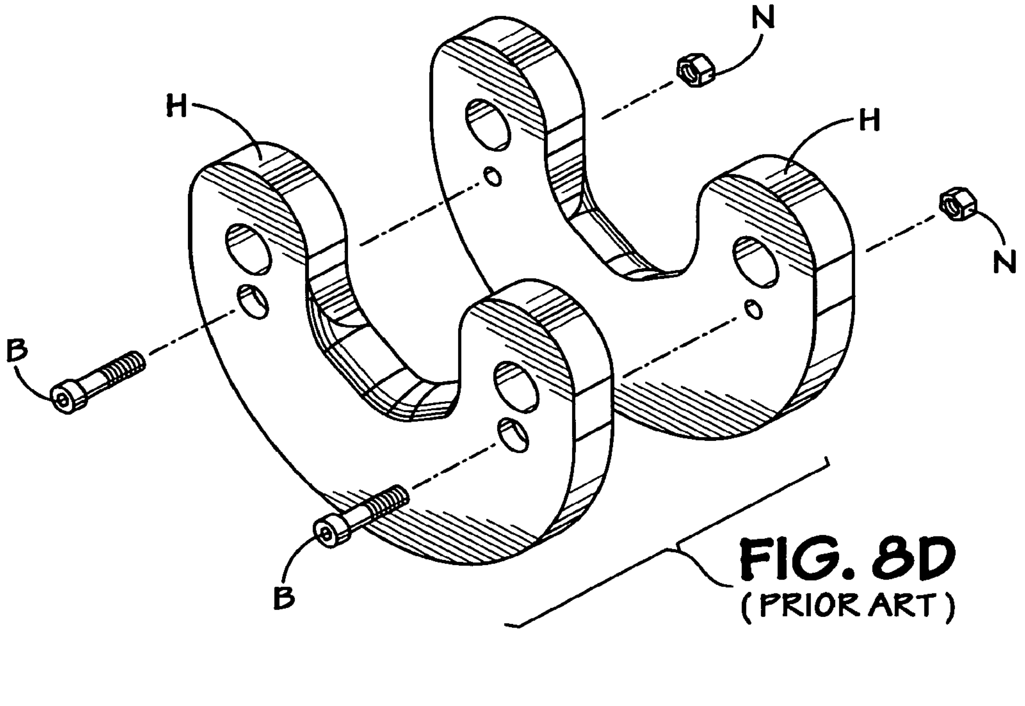
FIG. 8D
(PRIOR ART)

FIG. 9A
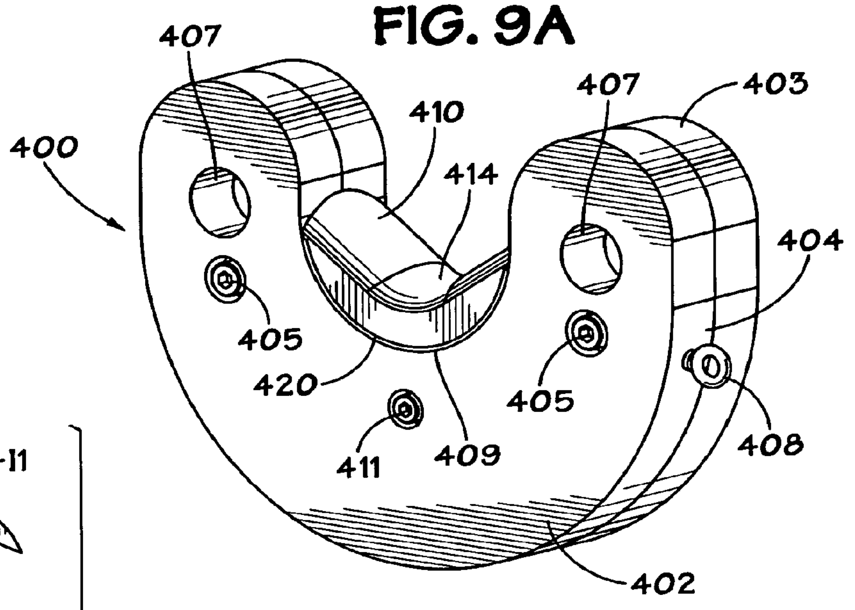
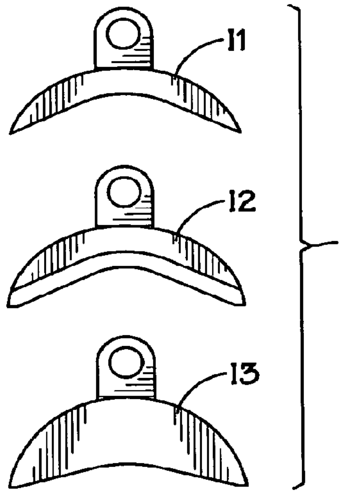
FIG. 9C
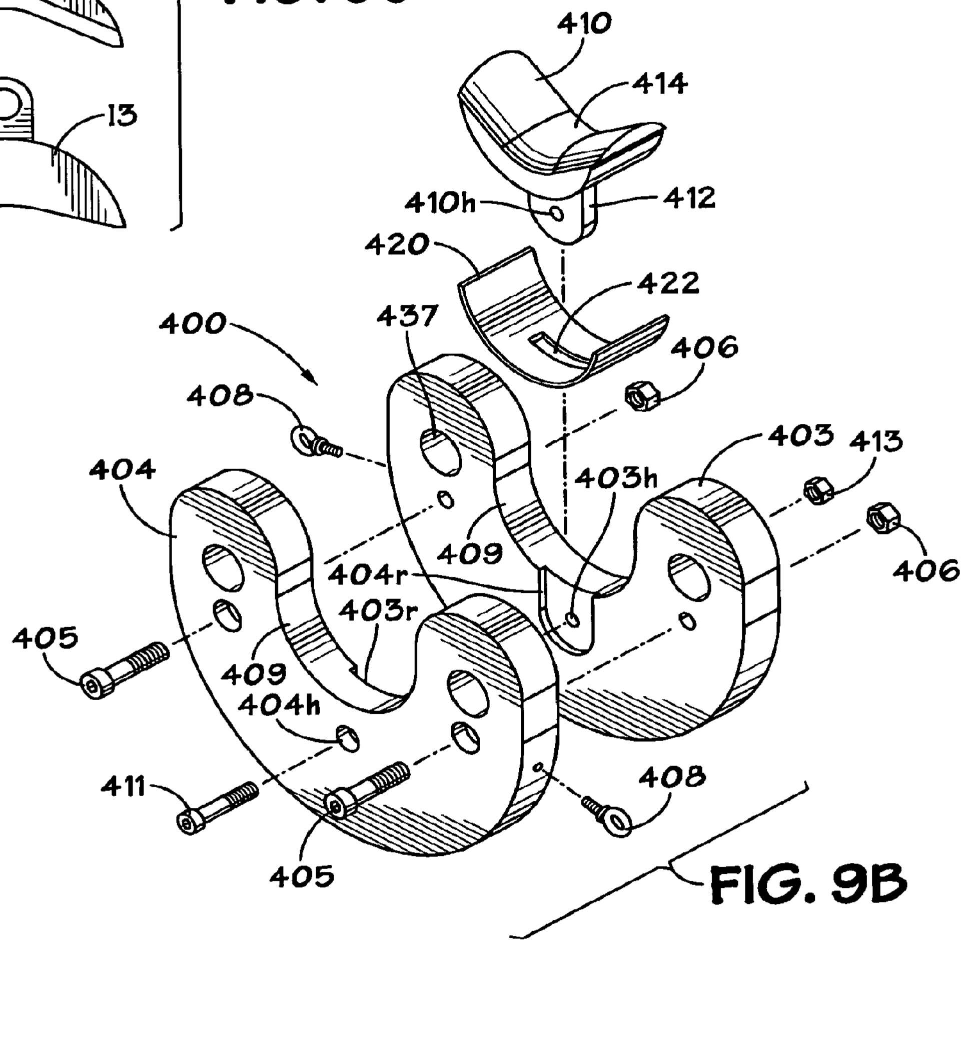
FIG. 9B

FIG. 10A
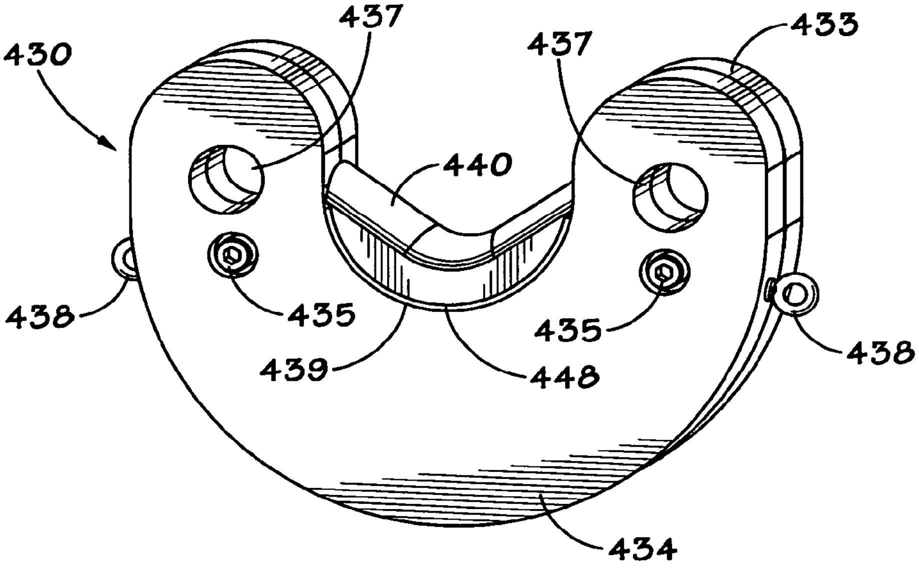
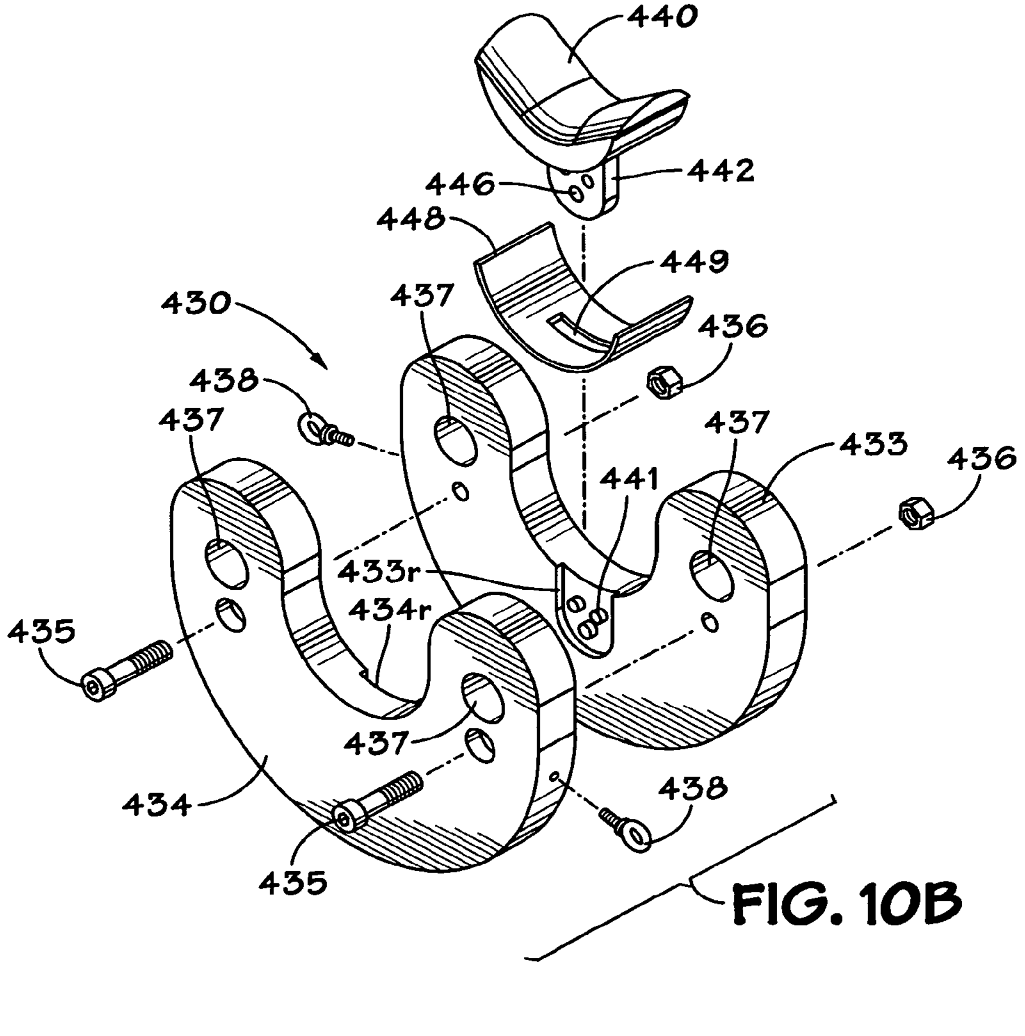
FIG. 10B

FIG. 11A
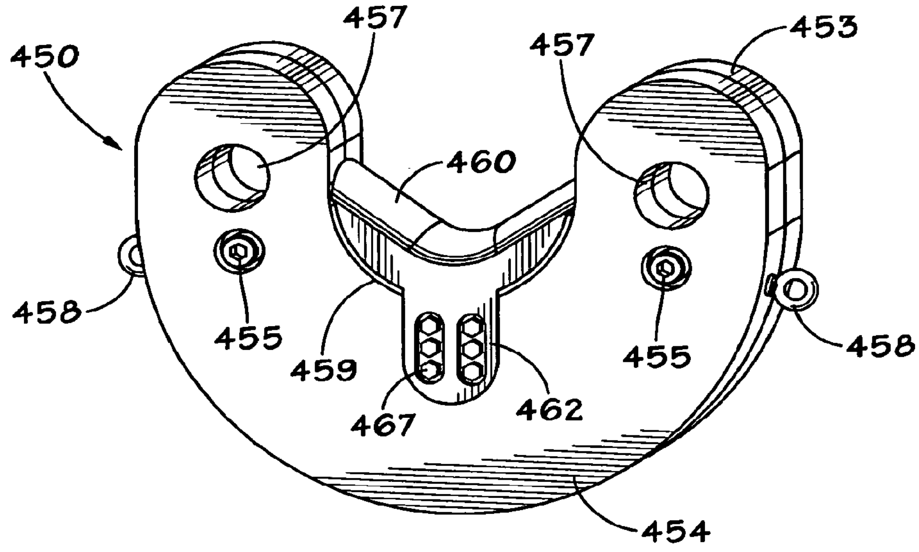
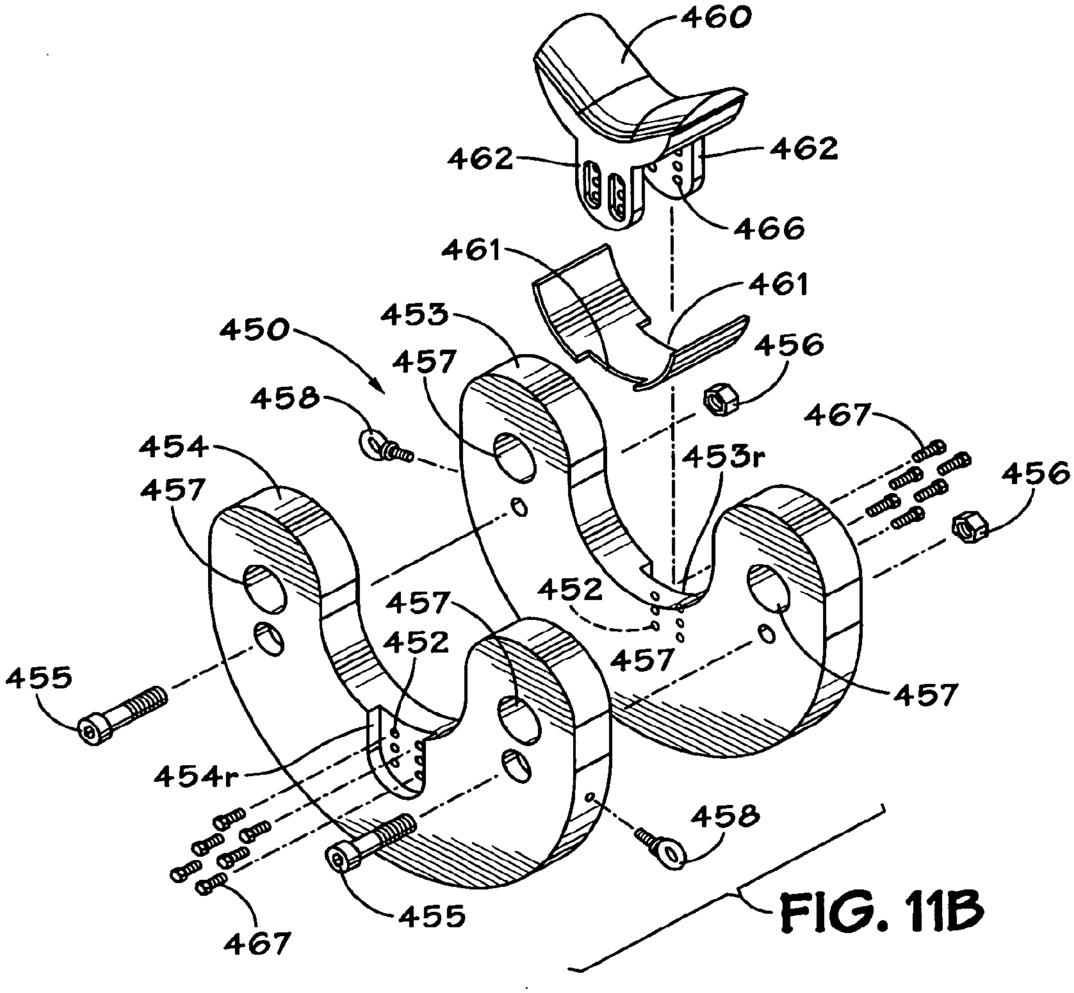
FIG. 11B

FIG. 12A
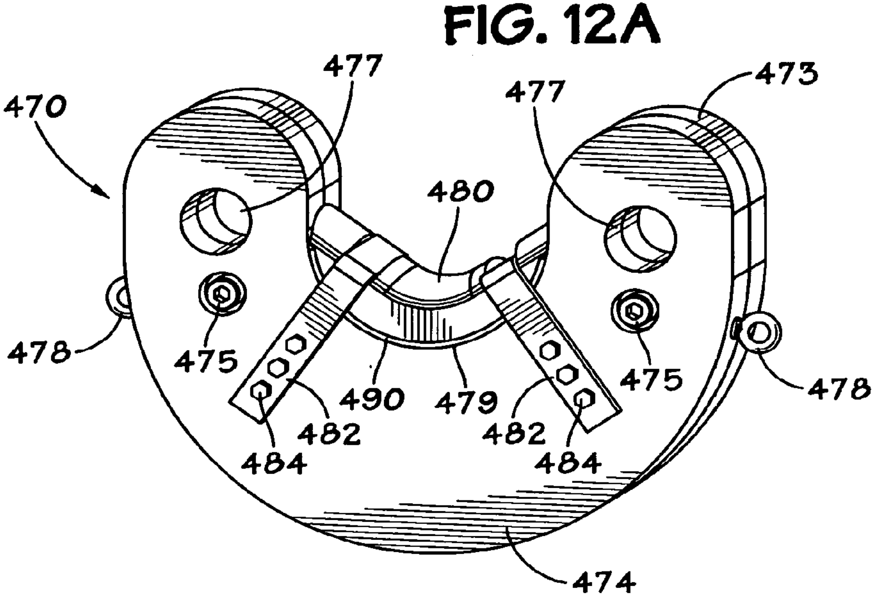
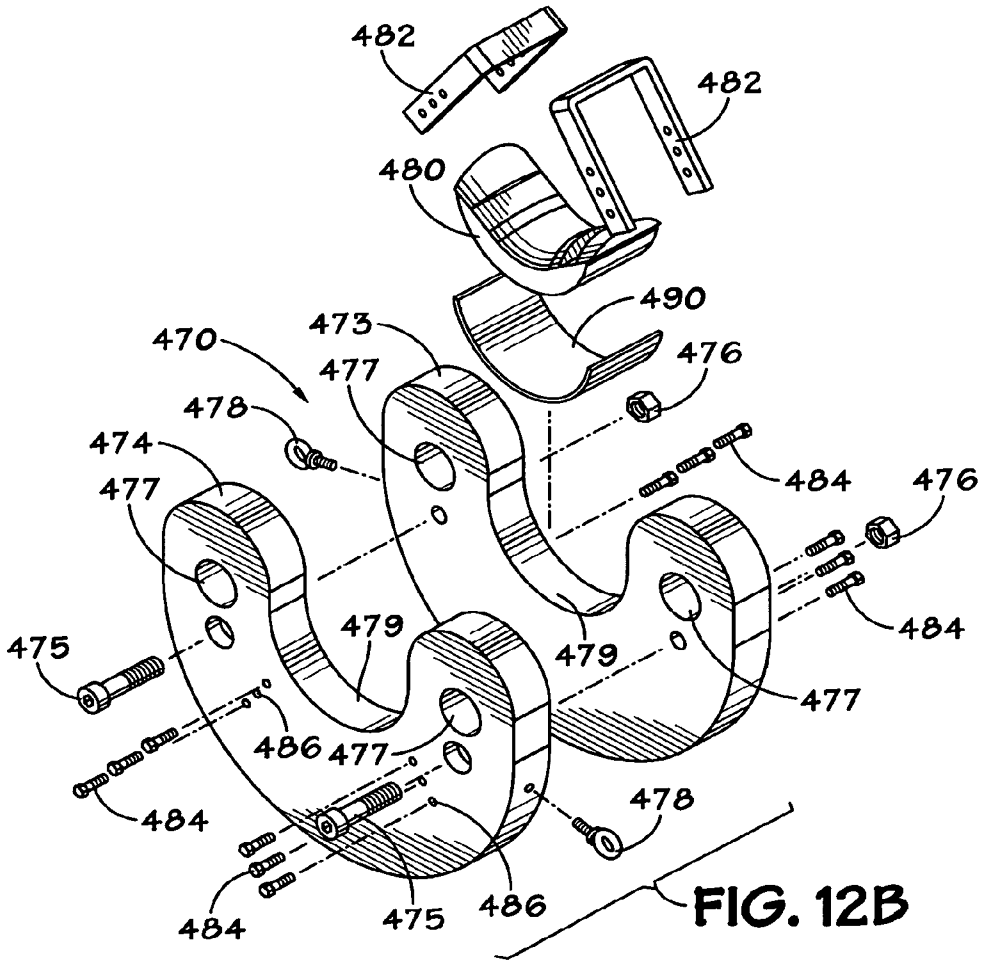
FIG. 12B

SUPPORT BECKET FOR RIG OPERATIONS

CROSS-REFERENCE TO RELATED APPLICATIONS

This is a divisional of application Ser. No. 12/292,899, filed Nov. 25, 2008, now abandoned.

BACKGROUND OF THE INVENTION

1. Field of the Invention

This present invention is directed to supports and beckets for use during wellbore operations; and in particular aspects, to hooks, links, elevators, and beckets used with traveling blocks or top drives.

2. Description of Related Art

The prior art discloses a wide variety of support beckets used during wellbore operations. In certain instances a support becket (see e. g. the support becket SB, Fig. SA) is connected to a traveling block system (e.g. system TS, Fig. SA). In certain instances, a top drive is suspended from a hook which in turn is suspended from a support called a "becket" attached to a traveling block in a derrick. Portions of beckets that come in contact with other items are subject to wear. In the past, replacing or repairing a worn becket has resulted in rig down time and in expensive costs of repair or replacement.

Top drive beckets are disclosed, e.g., in U.S. Pat. Nos. 7,320,374; D 523,210; and 7,370,707 (check re: "becket") (a list which is exemplary and not meant to be exhaustive), all of which patents are incorporated fully herein for all purposes.

BRIEF SUMMARY OF THE INVENTION

The present invention discloses, in certain aspects, a becket having a wear insert. In certain aspects, the wear insert is releasably connected to the support becket. In certain aspects, the wear insert is located in a support area, or "saddle" area of the becket.

In certain aspects, the wear insert has a shape corresponding to a shape of a recess of a becket.

In certain aspects, a bolt or other fastener, releasably connects the insert to a becket.

In certain aspects, the becket, or at least a wear area thereof, has a wear coating.

In certain aspects, a seating shoe is used between a wear insert and a becket.

The present invention discloses, in certain aspects, a hook with a wear insert; a link with a wear insert or inserts; and an elevator with a wear insert or inserts.

The present invention discloses, in certain aspects, a becket for supporting an item during wellbore operations, the becket including a becket body with a saddle support area, and a wear insert over the saddle support area. The present invention discloses, in certain aspects, a support member for supporting an item, the support member including: a support body; a support surface on the body; a wear insert over the support surface; and the wear insert releasably secured to the support body. The support body may be a body of one of hook, link, becket, drilling hook, top drive becket, traveling block becket, and elevator.

The present invention discloses, in certain aspects, a plurality of wear inserts for a support member, each wear insert of the plurality of inserts including: a wear insert body; each wear insert body of a size different from a size of the other wear insert bodies; each wear insert body of a size for accommodating structure of an item to be supported; and each wear insert body shaped and configured for correspondingly abutting a support surface of a support member.

Accordingly, the present invention includes features and advantages which are believed to enable it to advance support member and becket technology. Characteristics and advantages of the present invention described above and additional features and benefits will be readily apparent to those skilled in the art upon consideration of the following detailed description of preferred embodiments and referring to the accompanying drawings.

Certain embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

What follows are some of, but not all, the objects of this invention. In addition to the specific objects stated below for at least certain preferred embodiments of the invention, there are other objects and purposes which will be readily apparent to one of skill in this art who has the benefit of this invention's teachings and disclosures. It is, therefore, an object of at least certain preferred embodiments of the present invention to provide new, useful, unique, efficient, nonobvious top drive systems with beckets having replaceable wear members and universal wear members releasably connectible to a becket.

The present invention recognizes and addresses the problems and needs in this area and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of certain preferred embodiments, given for the purpose of disclosure, when taken in conjunction with the accompanying drawings. The detail in these descriptions is not intended to thwart this patent's object to claim this invention no matter how others may later attempt to disguise it by variations in form, changes, or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly from a cursory inspection or review the nature and general area of the disclosure of this invention. The Abstract is neither intended to define the invention, which is done by the claims, nor is it intended to be limiting of the scope of the invention or of the claims in any way.

It will be understood that the various embodiments of the present invention may include one, some, or all of the disclosed, described, and/or enumerated improvements and/or technical advantages and/or elements in claims to this invention.

Certain aspects, certain embodiments, and certain preferable features of the invention are set out herein. Any combination of aspects or features shown in any aspect or embodiment can be used except where such aspects or features are mutually exclusive.

BRIEF DESCRIPTION OF THE SEVERAL VIEWS OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 1C is a side view of the becket according to the present invention of FIG. 1A.

FIG. 1D is a cross-section view of the becket of FIGS. 1A and 1C.

FIG. 1E shows various side views of inserts according to the present invention.

FIG. 1F is a side view of an insert according to the present invention.

FIG. 1G is a top view of the insert of FIG. 1F.

FIG. 1H is an end view of the insert of FIG. 1F.

FIG. 1I is a side view of a becket according to the present invention.

FIG. 2A with an insert according to the present invention is a side view of a becket according to the present invention.

FIG. 2B is a top cross-section view of the becket of 5 FIG. 2A.

FIG. 2C is a side cross-section view of the becket of FIG. 2A.

FIG. 3A is a side view of a becket body of the becket of FIG. 2A.

FIG. 3B is a side cross-section view of the body of FIG. 3A.

FIG. 4A is a side view of a becket insert according to the present invention of the becket of FIG. 2A.

FIG. 4B is a top view of the becket insert of FIG. 4A.

FIG. 4C is a side view of the becket insert of FIG. 4A.

FIG. 5 is a side view of the system according to the present invention.

FIG. 6 is a side view of a system according to the present invention.

FIG. 8C is a perspective view of the becket of FIG. 8A.

FIG. 8D is an exploded view of the becket of FIG. 8C.

FIG. 9A is a perspective view of a becket according to the present invention.

FIG. 9B is an exploded view of the becket of FIG. 9A.

FIG. 9C is a side view of becket inserts according to the present invention.

FIG. 10A is a perspective view of a becket according to the present invention.

FIG. 10B is an exploded view of the becket of FIG. 10A.

FIG. 11A is a perspective view of a becket according to the present invention.

FIG. 11B is an exploded view of the becket of FIG. 11A.

FIG. 12A is a perspective view of a becket according to the present invention.

FIG. 12B is an exploded view of the becket of FIG. 12A.

Figure 1A:
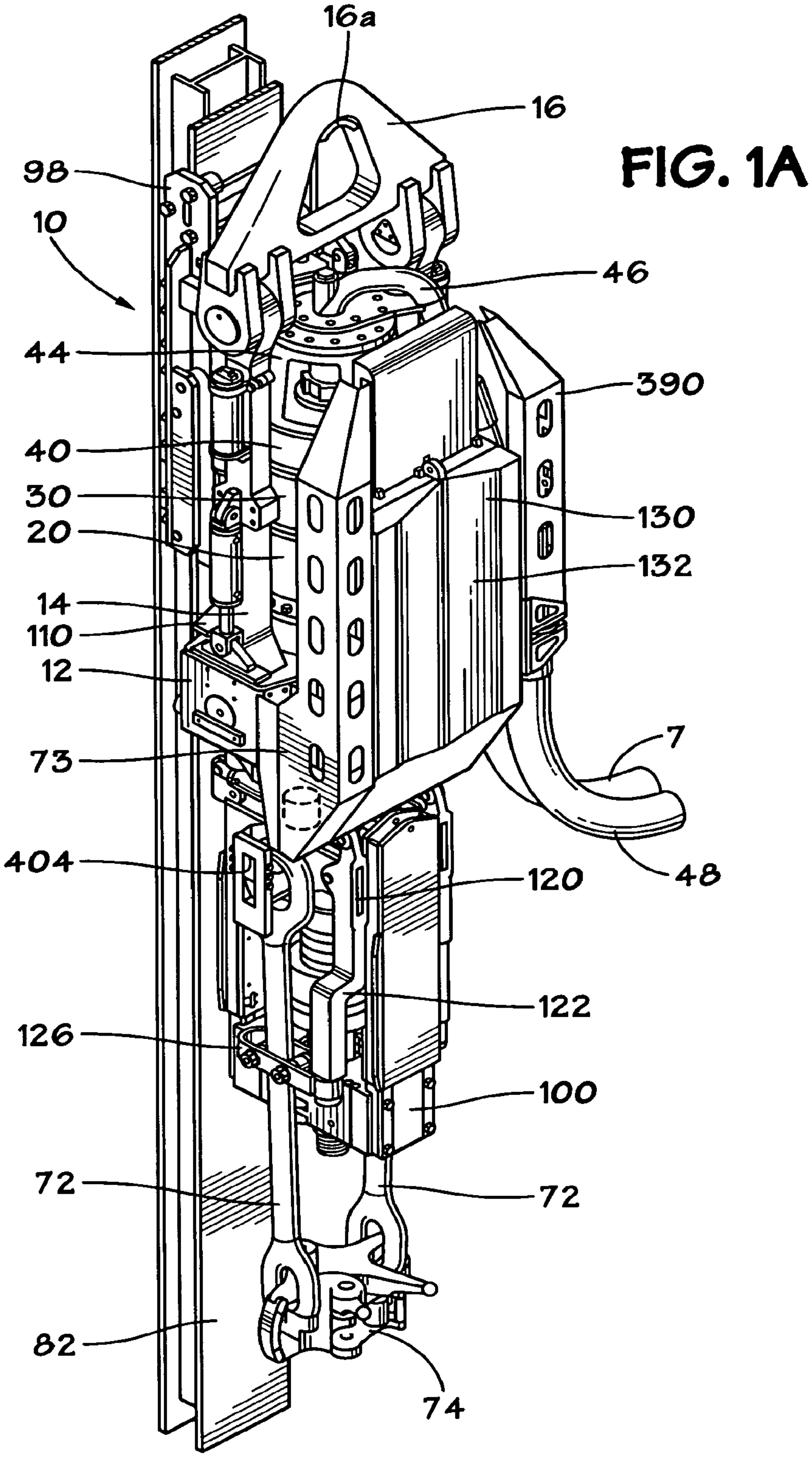
FIG. 1A is a perspective view of a system according to the present invention with a becket according to the present invention.

Presently preferred embodiments of the invention are shown in the above-identified figures and described in detail below. Various aspects and features of embodiments of the invention are described below and some are set out in the dependent claims. Any combination of aspects and/or features described below or shown in the dependent claims can be used except where such aspects and/or features are mutually exclusive. It should be understood that the appended drawings and description herein are of preferred embodiments and are not intended to limit the invention or the appended claims. On the contrary, the intention is to cover all modifications, equivalents and alternatives falling within the spirit and scope of the invention as defined by the appended claims. In showing and describing the preferred embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiment, and are not intended to mean the claimed invention of any particular appended claim(s) or all of the appended claims. Accordingly, the subject or topic of each such reference is not automatically or necessarily part of, or required by, any particular claim(s) merely because of such reference. So long as they are not mutually exclusive or contradictory any aspect or feature or combination of aspects or features of any embodiment disclosed herein may be used in any other embodiment disclosed herein.

DETAILED DESCRIPTION OF THE INVENTION

Figure 1B:
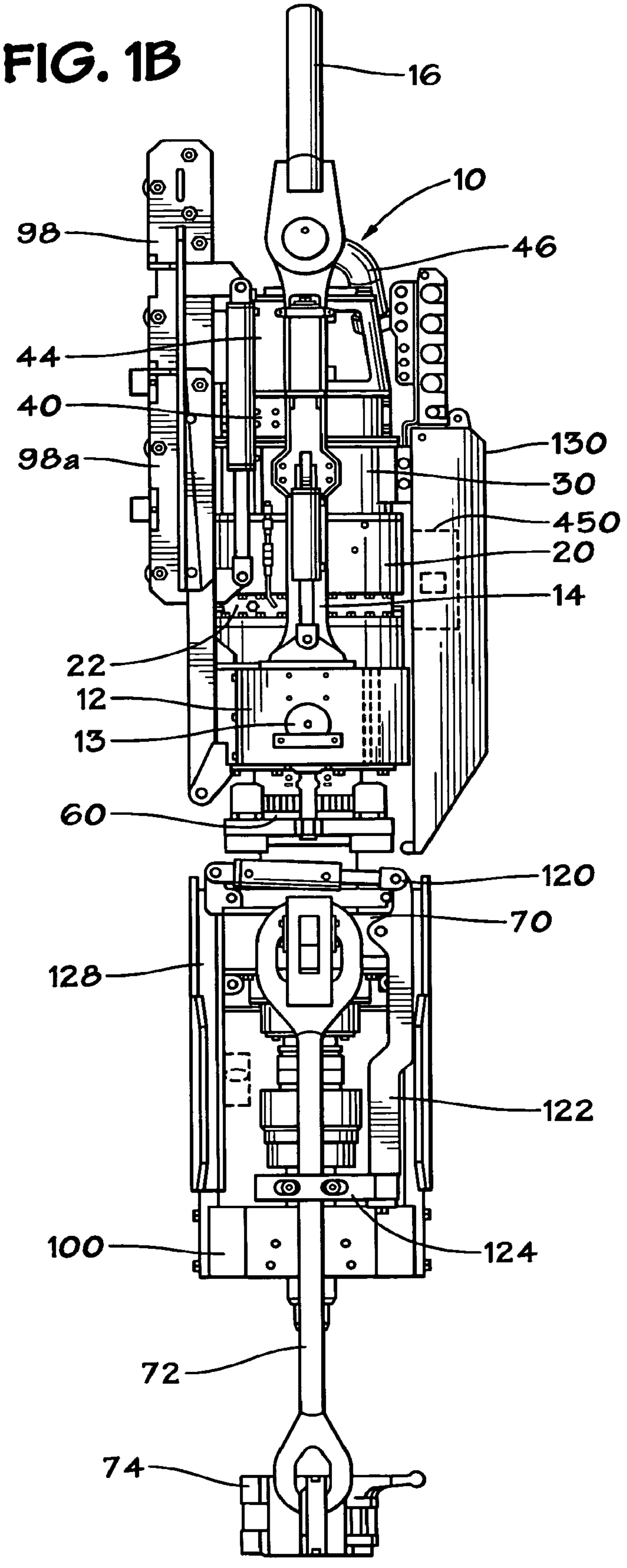
FIG. 1B is a side view of the system of FIG. 1A.

FIGS. 1A and 1B show a top drive system 10 according to the present invention with a becket 16 according to the present invention which has a becket insert **16*a* according to the present invention. The top drive system 10 according to the present invention which has a swivel body 12 suspended with links 14 from the becket 16. The becket 16 is connected to a travelling block (not shown). A gear system 20 is mounted on a spacer plate 22 which is supported by the swivel body 12. A motor 30 is coupled to the gear system 20. A brake system 40 connected to the motor 30 is within a bonnet 44 through which extends a gooseneck 46 connected to a kelly hose 7 (which is adjacent a service loop 48) through which flows drilling fluid. An extension system 98 provides horizontal displacement of the top drive system 10. A system 100 for selectively gripping tubulars is suspended from a load collar 70. Links 72 suspend an elevator 74 from the load collar 70. A counterbalance system 110 (which can hold the weight of the entire system 10 during stabbing of tubulars) includes load compensators. A link tilt system 120 provides selective tilting of the links 72 and thus selective movement and tilting of the elevator 74 and movement of a tubular or stand of tubular supported by the elevator 74 to and away from a wellbore centerline. Bail retainers 404 retain the links 72 on the load collar 70. Link tilt hydraulic cylinders 128 are interconnected pivotably between the load collar 70 (connected to its ears 128***a*) and arms 122. Each connector 124 is pivotably connected to a lower end of an arm 122 and to a clamp 126 which is clamped to a link 72. Guards 73 and 390 are on sides of an access platform 130. Optionally, the access platform 130 may have an indented portion 132 for facilitating the placement of tubulars thereon and for facilitating movement of tubulars on the exterior of the access platform 130. The top drive system 10 can be movably mounted on a beam 82 (or "torque tube"). Horizontal displacement is provided by the extension system 98 which includes a torque bushing 98*a*. The extension system 98 with the top drive system attached thereto is movable vertically on the beam 82 with the top drive system attached thereto. Although one particular embodiment of a top drive system is shown, it is to be understood that a becket according to the present invention (e.g., including, but not limited to a becket 16 or any becket according to the present invention disclosed herein) may be used with any known top drive system e.g. with that of U.S. Pat. No. 7,320,374 which is like the system 10 if FIGS. 1A and 1B.

In one aspect the becket insert 16*a* is releasably connected to the becket 16; e.g., but-not limited to with pin(s), bolt(s), clamp(s), fastener(s), fastening material, adhesive(s), and/or adhesive material.

FIG. 1E shows a variety of becket inserts according to the present invention becket—inserts A, B, C, and D, each shown in a side view.

FIGS. 1F-1H show a becket insert 150 according to the present invention which has a body 152 and two ends 154. Sides 156 of the becket insert 150 are spaced apart by a bottom 158 and, in one aspect, are spaced apart so that they can be fit over a top interior part of a becket and held there with a friction fit. Optionally, any suitable clamp, fastener, fastener material, screw, bolt and/or adhesive can be used with the becket insert 150 (and with any insert according to the present invention).

FIG. 1I shows a becket 160 according to the present invention with an insert 162 according to the present invention. The insert 172 has a top 164 that corresponds in shape to a top 166 of the becket 160. A strap or clamp 170 holds the becket insert 172 in place. The clamp or strap 170 can go completely around the becket 160 or only partially around it. It may be made of any suitable material including, but not limited to hardfaced metal material and/or ballistic material, e.g. KEVLAR (Trademark) material.

Optionally, in addition to or instead of the strap 170, a plate 174 may be pinned with pins 175, 176 to the becket 160 and the insert 172 to hold the insert 172 in place.

Optionally, in addition to or instead of a strap 170 and/or a plate 174, an amount 177 of releasable fastener material on the insert 172 may co-act with a corresponding amount of releasable fastener material 178 on the becket 160 to hold the insert 172 in place. Any or all of the plate 174, strap 170, and/or amounts of releasable fastener material 177, 178 may be used with any insert according to the present invention, with or without bolt{s), screw{s), fastener{s) and/or adhesive{s).

FIGS. 2A-2C show a becket 200 according to the present invention which has a becket body 202 with two arms 204 with holes 206, holes 208 with bolts 209 connecting halves 202*a*, 202*b* of the body 202 and lifting rings 210. A bolt 212 extends through a hole 214 and through a corresponding hole 224 in a bar 226 of the becket insert 220 according to the present invention to releasably secure the becket inset 220 to the body 202. The becket insert 220 is located in a top recess 216 of the body 202.

The becket insert 220 has a body 232 with optional lower tapered surfaces 234. The body 232 is, in one aspect, crescent shaped as shown (as viewed in FIG. 4A). The body 202 of the becket 200 may have a recess portion 218 of the recess 216 shaped specifically to correspond to the top shape (as viewed in FIG. 4A) of the becket insert 220. Other than crescent-shaped as shown, the top shape of the body 232 and the shape of the portion 218 may be any desired shape.

It is within the scope of the present invention to provide an insert (like the becket inserts described above) for a top portion of a drilling hook. As shown in a system 500, FIG. 5, a becket 512 of a travelling block 502 supports a drilling hook 504 which has an insert 506 connected at a top recess 508 of the drilling hook 504. The drilling hook 504 supports, a drive system 510 which includes support bails 512 (one shown; two used) (optionally the bails 152 have an insert 514—like any becket insert disclosed herein) which supports a power swivel 516.

As shown in FIG. 6, the drilling hook 504 can be removed and the bails 512 of the drive system 500 are supported directly by the becket 512 of the travelling block 502.

Figure 7:
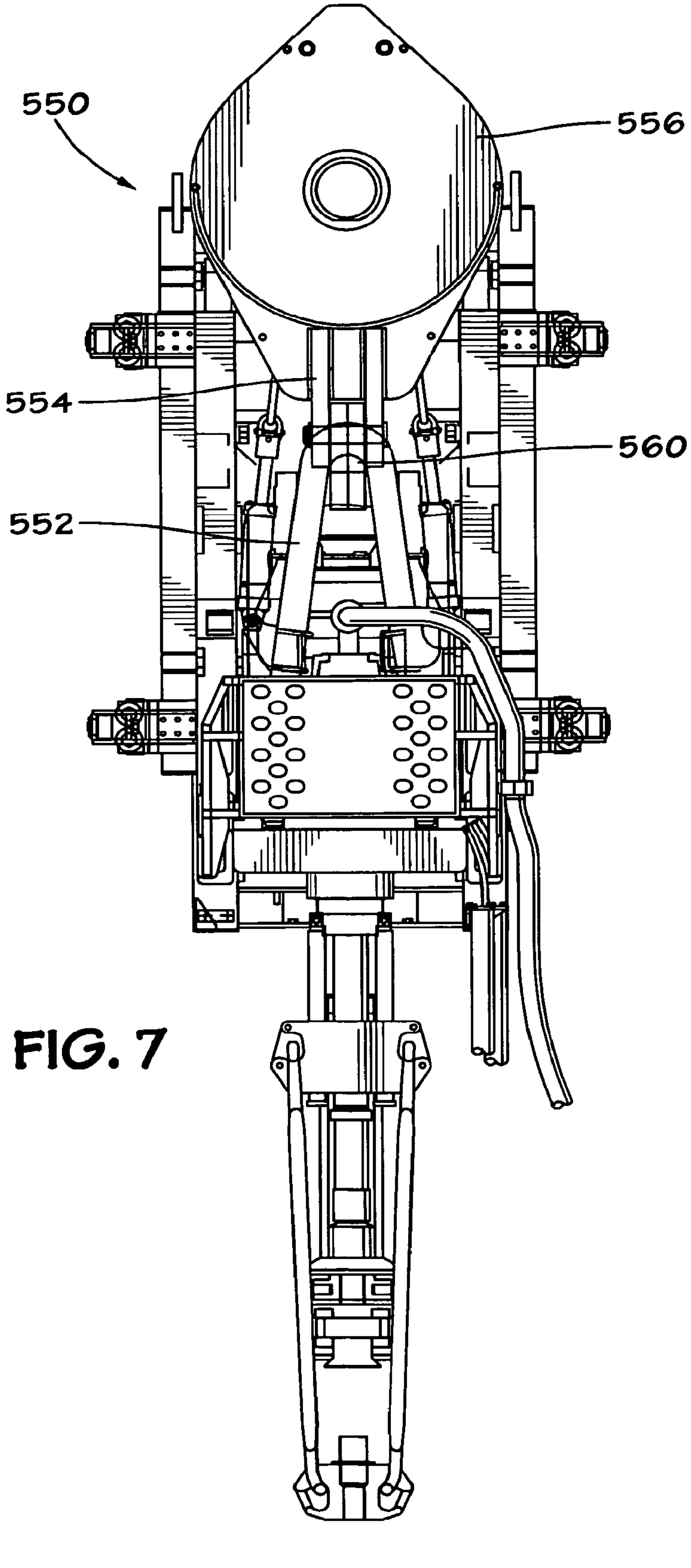
FIG. 7 is a side view of a system according to the present invention.

FIG. 7 illustrates a top drive system 550 with support bails 552 on a travelling block becket 554 of a travelling block 556. There are two bails 552, one on each side of the block becket 554 (one bail shown). An insert 560 is connected to each bail 552 (any becket insert disclosed herein).

Any insert according to the present invention may be made of known wear resistant, hardfacing or carbide material; including, but not limited to ASTM A514 material, HARDOX™ 400 material, or PUC-12N (Trademark) material.

Figure 8B:
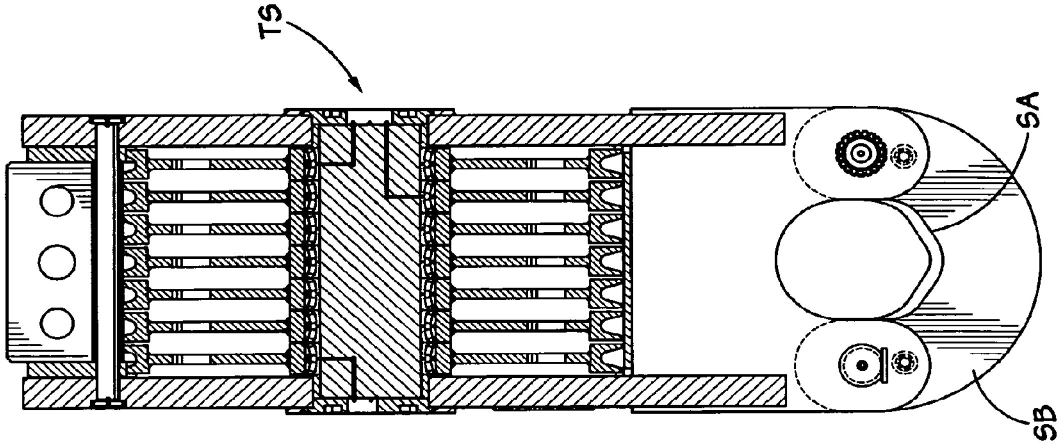
FIG. 8B (PRIOR ART)
FIG. 8B is a front cross-section view of the block and becket of FIG. 8A.
Figure 8A:
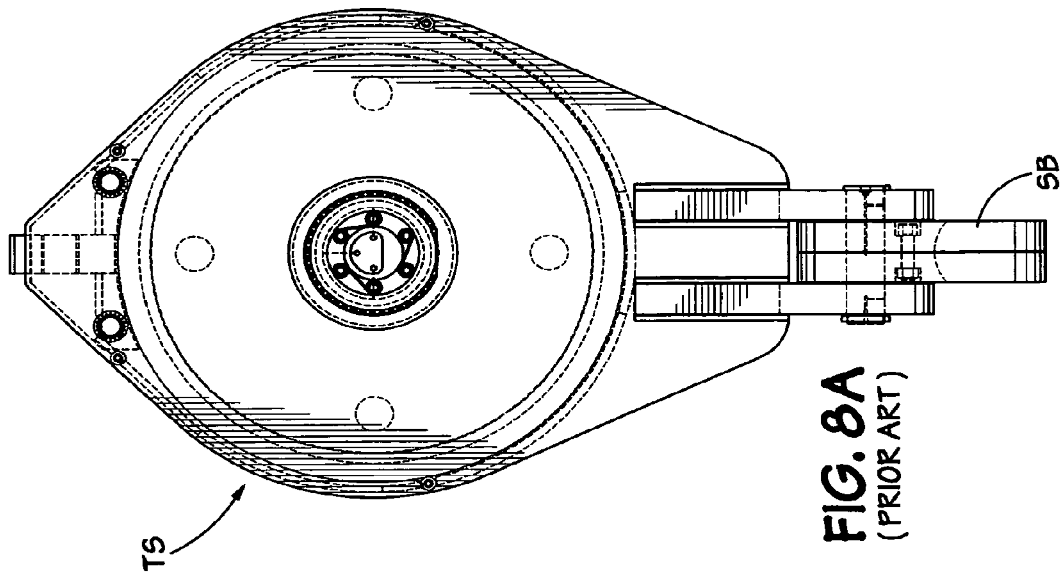
FIG. 8A (PRIOR ART)
FIG. 8A is a side view of a prior art traveling block and becket.

FIGS. 8A and 8B show a prior art traveling block system TS with a prior art support becket SB. The becket SB has a saddle area SA which can significantly wear and degrade in use. As shown in FIG. 8D, the becket SB is made of two halves H (e.g. of steel plate) bolted together with bolts B and nuts N. The saddle area SA of the becket SB is fixed with respect to size and configuration and is, therefore, suitable for use only with certain specific sizes and types of equipment.

FIG. 9A-12B illustrate various beckets according to the present invention. It is within the scope of this invention to provide any wear insert or wear-insert-seating-shoe combination according to the present invention for any area or surface in any supporting member used during wellbore operations. The specific dimensions and shapes of a wear inset according to the present invention can be chosen for differing contact surfaces and radii and for different load ratings, e.g., but not limited to, specific API requirements and specifications.

FIGS. 9A and 9B illustrate a becket 400 according to the present invention which has a body 402 which includes two halves 403, 404 held together by bolts 405 and nuts 406. Optional lifting lugs 408 are provided on sides of the becket 400. Pins (not shown) through holes 407 secure the becket to a traveling block.

Each half 403, 404 has a recess 403*r*, 404*r*, respectively for a lug 412 of an insert 410. A bolt 411 passing through holes 403*h*, 404*h*, in the halves 403, 404, respectively, and through a hole 410*h* of the insert 410 is secured with a nut 413 to connect the insert 410 to the halves 403, 404.

Optionally, a seating shoe 420 is used between a saddle area 409 of the becket 400 and an underside of the insert 410. The lug 412 passes through a hole 422 of the shoe 420. The shoe 420 and the underside of the insert 410 are shaped to correspond to the exterior surface of the saddle area 409 of the becket 400.

In one aspect the seating shoe 420 is made of softer material than the material of the insert 410 and of the becket 400 so that the shoe 420 deforms to allow the insert 410 to seat well against the becket's saddle area 409.

As shown, the insert 410 has a saddle area 414 which has a specific shape, size and configuration which will accommodate corresponding items and equipment of a certain size and shape. It is within the scope of the present invention to provide any becket according to the present invention with a plurality of inserts of different shapes sizes and configurations so that, by changing an insert, a single becket can accommodate a range of equipment sizes and shapes. For example, a series of inserts I1, I2, and I3 as shown in FIG. 9C can be used with a becket (or any item) according to the present invention; e.g., for accommodating different size supports, links, etc.

FIGS. 10A and 10B show a becket 430 according to the present invention which has halves 433, 434 held together by bolts 435 and nuts 436. Optional lifting lugs 438 are provided on sides of the becket 430. Holes 437 function as do the holes 407.

Each half 433, 434 has a recess 433*r*, 434*r*, respectively for a lug 442 of an insert 440. Studs 441 on the half 433, projecting from a side of the recess 433*r*, pass through corresponding holes 446 in the lug 442. At least one stud or one, two, three or more studs may be used. When the halves 433, 434 are secured together with the bolts 435, the insert 440 is secured in place at a saddle area 439 of the becket 430.

Optionally a seating shoe 448 is used between the insert 440 and the saddle area 439 of the becket 430. A hole 449 in the shoe 448 accommodates the lug 442.

FIGS. 11A and 11B show a becket 450 according to the present invention which has halves 453, 454 held together by bolts 455 and nuts 456. Optional lifting lugs 458 are provided on sides of the becket 450. Holes 457 function as do the holes 407.

Each half 453, 454 has a recess 453*r*, 454*r*, respectively for a lug 462 of an insert 460. Bolts 467 passing through holes 452 in the halves 453, 454 and holes 466 in the lug 462 secure the insert 460 in place at a saddle area 459 of the becket 450.

Optionally a seating shoe 468 is used between the 5 insert 460 and the saddle area 459 of the becket 450. Cutouts 461 in the shoe 468 accommodates the lug 462.

FIGS. 12A and 12B show a becket 470 according to the present invention which has halves 473, 474 held together by bolts 475 and nuts 476. Optional lifting lugs 478 are provided on sides 10 of the becket 470. Holes 477 function as do the holes 407.

Optionally a seating shoe 490 is used between the insert 480 and the saddle area 479 of the becket 470.

Braces 482, held in place by bolts 484 through holes 486, secure an insert 480 at a saddle area 479 of the becket 470. Either brace may be deleted and at least one brace may be used or two or more.

Figure 13A:
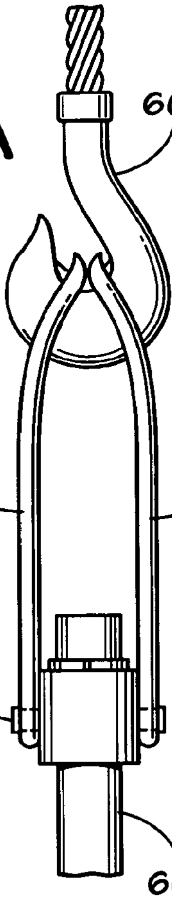
FIG. 13A is a side view of a hook according to the present invention supporting items therebelow.
Figure 13B:
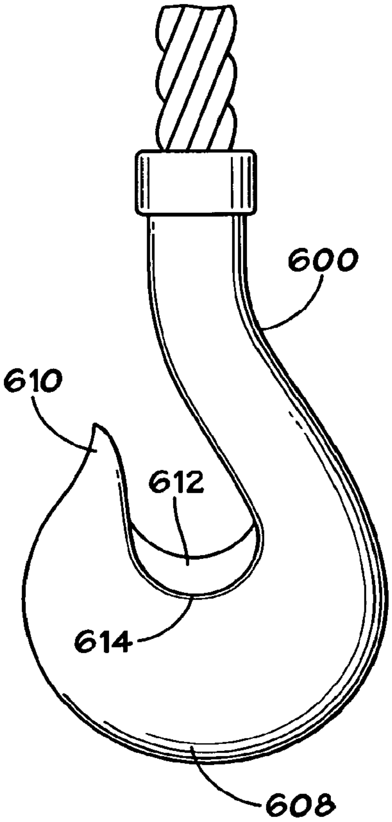
FIG. 13B is a side view of the hook of FIG. 13A.

FIGS. 13A and 13B show a hook 600 according to the present invention supporting links 602, an elevator 604, and a pipe 606. The hook 600 has a body 608, a lip 610 and an insert 612 over a support area 614 (insert 612 shown schematically; may be any insert according to the present invention disclosed herein connected to the hook 600 in any way described herein).

Figure 14:
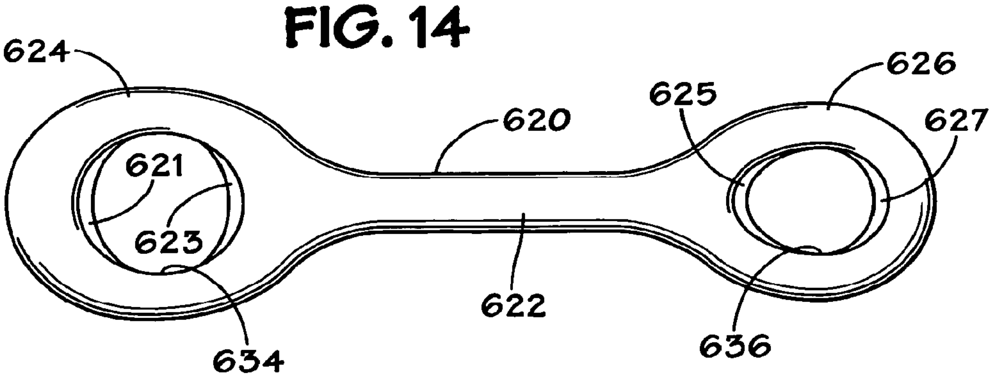
FIG. 14 is a side view of a link according to the present invention.

FIG. 14 shows a support link 620 with a body 622 and two ends 624 and 626 each with an opening 634, 636 respectively. The end 624 has two inserts 621, 623 and the end 626 has two inserts 625, 627. Optionally any one, two, or three of the inserts 621, 623, 625, 627 is deleted.

Each of the inserts 621, 623, 625, 627 (shown schematically) may be any insert according to the present invention disclosed herein connected to the link 620 in any way described herein.

Figure 15:
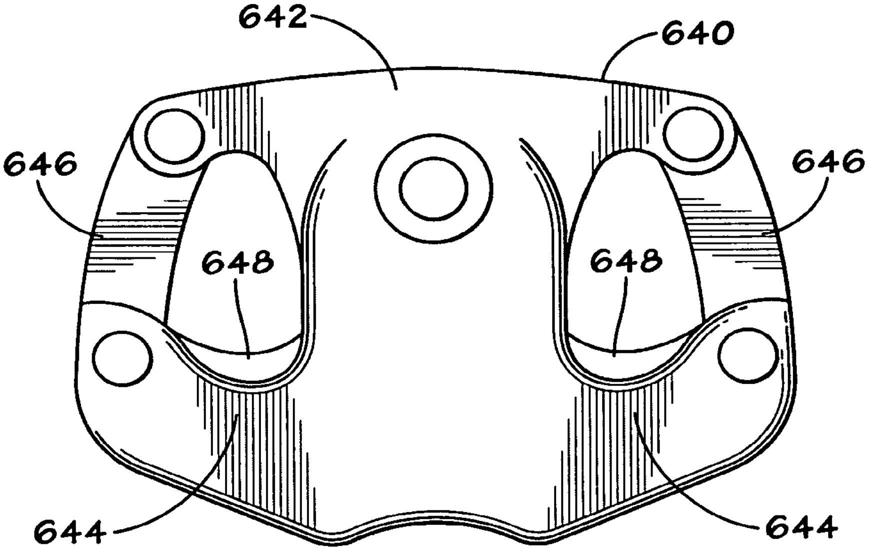
FIG. 15 is a side view of an elevator according to the present invention.

FIG. 15 shows an elevator 640 according to the present invention which has a body 642 and two support eyes 644 with selectively openable latches 646. Each eye 644 has an insert 648 according to the present invention (shown schematically) which may be any insert according to the present invention connected to the body 642 in any way described herein.

Figure 16:
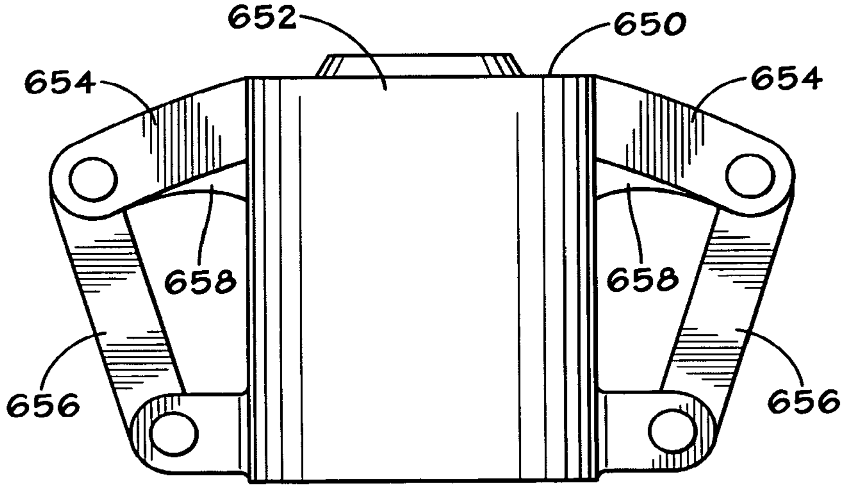
FIG. 16 is a side view of an elevator according to the present invention.

FIG. 16 shows an elevator 650 according to the present invention which has a body 652 and two support eyes 654 with selectively openable latches 656. Each eye 654 has an insert 658 according to the present invention (shown schematically) which may be any insert according to the present invention connected to the body 652 in any way described herein.

As shown, e.g., in FIGS. 10A, 11A, and 12A, a top surface of a wear insert according to, the present invention may have a different shape than the shape of the becket body surface which the wear insert abuts.

The present invention, therefore, provides in at least some embodiments, a becket for supporting an item during wellbore operations, the becket including: a becket body with a saddle support area; and a wear insert over the saddle support area. Such a becket according to the present invention may have one or some (in any possible combination) of the following: a seating shoe between the saddle support area and the wear insert; wherein the seating shoe is made of material softer than the wear insert; the wear insert has a lower surface with an insert shape and the seating shoe has an upper surface with a shoe shape and the insert shape corresponds to the shoe shape; the wear insert having a wear insert body, a lug projecting from the wear insert body, and the lug secured to the becket body; a seating shoe between the saddle support area and the wear insert, the seating shoe having a shoe opening, and the lug of the wear insert passing through the shoe opening; the becket body having two halves secured together, each half of the two halves having a recess for receiving a portion of the lug of the wear insert; the recess of each half is on an interior surface thereof; at least one stud projecting from a recess of at least one half of the body, the lug of the wear insert having at least one stud hole, and the at least one stud projecting into a corresponding stud hole on the lug; the recess of each half is on an exterior surface thereof; a seating shoe between the saddle support area and the wear insert, the seating shoe having spaced-apart side cutouts, the lug comprising two spaced-apart lug portions, a lug portion passing through each spaced-apart side cutout of the seating shoe, and a lug portion in each recess; at least one brace securing the wear insert to the becket body; the becket is a top drive becket; and/or the becket body saddle support area has a first surface with a first shape, the wear insert has a lower surface that abuts the first surface, the wear insert has a top surface with a second shape, and the second shape different from the first shape.

The present invention, therefore, provides in at least some embodiments, a becket for supporting an item during wellbore operations, the becket having: a becket body with a saddle support area; a wear insert over the saddle support area; a seating shoe between the saddle support area and the wear insert, the seating shoe is made of material softer than the wear insert; the wear insert having a wear insert body, a lug projecting from the wear insert body, and the lug secured to the becket body.

The present invention, therefore, provides in at least some embodiments, a support member for supporting an item, the support member having a support body, a support surface on the body, a wear insert over the support surface, and the wear insert releasably secured to the support body. Such a support member according to the present invention may have one or some (in any possible combination) of the following: wherein the support body is a body of one of hook, link, becket, drilling hook, top drive becket, traveling block becket, and elevator; a seating shoe between the support surface and the wear insert; and/or the seating shoe made of material softer than the wear insert.

The present invention, therefore, provides in at least some embodiments, a plurality of wear inserts for a support member, each wear insert of the plurality of inserts having a wear insert body, each wear insert body of a size different from a size of the other wear insert bodies, each wear insert body of a size for accommodating structure of an item to be supported, and each wear insert body shaped and configured for correspondingly abutting a support surface of a support member.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps. The following claims. are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112. The inventors may rely on the Doctrine of Equivalents to determine and assess the scope of their invention and of the claims that follow as they may pertain to apparatus not materially departing from, but outside of, the literal scope of the invention as set forth in the following claims. All patents and applications identified herein are incorporated fully herein for all purposes. It is the express intention of the applicant not to invoke 35 U.S.C. §112, paragraph 6 for any limitations of any of the claims herein, except for those in which the claim expressly uses the words 'means for' together with an associated function. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The invention claimed is:

1. A becket adapted to support an item during wellbore operations, comprising:

a becket body, said becket body comprising:

an open end comprising two spaced-apart support arms; and a closed end comprising a substantially continuous saddle support area, a wear insert positioned over said substantially continuous saddle support area; and means for removably attaching said wear insert to said becket body, said means being positioned at said closed end of said becket body.

2. The becket of claim 1, wherein said wear insert is adapted to transfer a load from an item supported during wellbore operations to said substantially continuous saddle support area of said becket body.

3. The becket of claim 1, wherein said wear insert comprises a wear insert body and a first contact surface, said first contact surface being adapted to contactingly engage a first contact area of said substantially continuous saddle support area.

4. The becket of claim 3, wherein a shape of said first contact surface is substantially the same as a shape of said first contact area.

5. The becket of claim 3, wherein said first contact surface comprises a seating shoe that is adapted to be positioned between said wear insert body and said first contact area.

6. The becket of claim 5, wherein said seating shoe comprises a material that is adapted to be deformed so as to substantially conform to a shape of said wear insert body and said shape of said first contact area.

7. The becket of claim 6, wherein said seating shoe comprises a material that is softer than a material comprising said wear insert body.

8. The becket of claim 5, wherein a shape of a first surface of said wear insert body substantially corresponds to a shape of a second surface of said seating shoe.

9. The becket of claim 1, wherein said means for removably attaching said wear insert to said becket body comprises at least one of a clamp and a strap.

10. The becket of claim 1, wherein said means for removably attaching said wear insert to said becket body comprises one or more fasteners.

11. The becket of claim 1, wherein said means for removably attaching said wear insert to said becket body comprises a lug projecting from said wear insert body.

12. The becket of claim 11, wherein said becket body comprises a first becket body half and a second becket body half that is adapted to be removably coupled to said first becket body half, said first becket body half comprising a first recess and said second becket body half comprising a second recess, wherein said first and second recesses are adapted to receive said lug.

13. The becket of claim 12, wherein said means for removably attaching said wear insert to said becket body comprises positioning said lug in said first and second recesses.

14. The becket of claim 13, wherein said lug comprises a first lug adapted to be positioned in said first and second recesses and between said first and second becket body halves.

15. The becket of claim 14, wherein said means for removably attaching said wear insert to said becket body further comprises at least one stud projecting from at least one of said first and second recesses and at least one stud hole in said first lug, said at least one stud hole positioned and adapted to receive said at least one stud.

16. The becket of claim 13, wherein said lug comprises a first lug adapted to be positioned in said first recess and a second lug adapted to be positioned in said second recess, said second recess being positioned on an opposite side of said becket body from said first recess.

17. The becket of claim 1, wherein said becket comprises a top drive becket.

18. The becket of claim 1, wherein said wear insert comprises a second contact surface adapted to contactingly engage a second contact area of a support member supporting said becket during wellbore operations.

19. The becket of claim 18, wherein a shape of said second contact surface is substantially the same as a shape of said second contact area.

20. A becket adapted to support an item during wellbore operations, comprising:

- a substantially horseshoe-shaped becket body, said substantially horseshoe-shaped becket body comprising:
  - an open end comprising two spaced-apart support arms; and
  - a closed end comprising a substantially continuous saddle support area;
- a wear insert positioned over said substantially continuous saddle support area;
- a seating shoe positioned between said substantially continuous saddle support area and said wear insert, said seating shoe comprising a material that is adapted to be deformed so as to substantially conform to a shape of said wear insert; and
- a lug adapted to attach said wear insert to said substantially horseshoe-shaped becket body, said lug being positioned at said closed end of said substantially horseshoe-shaped becket body.

21. The becket of claim 20, wherein said seating shoe comprises a material that is softer than a material of said wear insert.

22. The becket of claim 20, wherein said wear insert is adapted to transfer a load from an item supported during wellbore operations to said substantially continuous saddle support area of said substantially horseshoe-shaped becket body.

23. A support member, comprising:

- a lifting device adapted to support a load during a lifting operation, said lifting device comprising an open end and a closed end, wherein said closed end comprises a substantially continuous support surface;
- a wear insert positioned over and said substantially continuous support surface of said closed end of said lifting device; and
- means for removably attaching said wear insert to said lifting device, said means being positioned at said closed end of said lifting device.

24. The support member of claim 23, wherein said lifting device comprises one of a hook, a becket, a drilling hook, a top drive becket, a traveling block becket, and an elevator.

25. The support member of claim 23, further comprising a seating shoe positioned between said substantially continuous support surface and said wear insert.

26. The support member of claim 25, wherein said seating shoe comprises a material that is softer than a material comprising said wear insert.

27. The support member of claim 23, wherein said lifting device is configured to be a substantially horseshoe-shaped lifting device comprising two spaced-apart support arms, said two spaced-apart support arms defining said open end.

28. The support member of claim 27, wherein at least one of said spaced-apart support arms comprises a hole positioned proximate an end thereof, said hole being adapted to be used to secure equipment to said support member.

29. The becket of claim 1, wherein at least one of said spaced-apart support arms comprises a hole positioned proximate an end thereof.

30. The becket of claim 29, wherein said hole in said at least one of said spaced-apart support arms is adapted to be used to secure drilling equipment to said becket body.

31. The becket of claim 30, wherein said drilling equipment comprises at least one of a top drive, a traveling block and a drilling hook.

32. The becket of claim 1, wherein said becket body is configured to be a substantially horseshoe-shaped becket body.

33. A becket adapted to support an item during wellbore operations, comprising:

- a becket body having an open end comprising two spaced-apart support arms and a closed end comprising a substantially continuous saddle support area, said becket body comprising:
  - a first becket body half comprising a first recess; and
  - a second becket body half comprising a second recess, wherein said second becket body half is adapted to be removably coupled to said first becket body half;
- a wear insert positioned over said substantially continuous saddle support area, said wear insert comprising a wear insert body and having a first contact surface that is adapted to contactingly engage a first contact area of said substantially continuous saddle support area; and
- means for attaching said wear insert to said becket body, said means comprising a lug projecting from said wear insert body, wherein said first and second recesses are adapted to receive said lug.

* * * * *

UNITED STATES PATENT AND TRADEMARK OFFICE

CERTIFICATE OF CORRECTION

PATENT NO. : 8,628,054 B2
APPLICATION NO. : 13/156559
DATED : January 14, 2014
INVENTOR(S) : Reece William Kaybridge et al.

It is certified that error appears in the above-identified patent and that said Letters Patent is hereby corrected as shown below:

In the Claims

Col. 11, line 47 (claim 23, line 6), after "positioned over" delete "and".

Signed and Sealed this
Fifteenth Day of April, 2014

Michelle K. Lee

Michelle K. Lee
*Deputy Director of the United States Patent and Trademark Office*